United States Patent [19]

Löhr et al.

[11] 4,003,892

[45] Jan. 18, 1977

[54] METHOD OF SEPARATING THIONINE AND ITS N-METHYL DERIVATIVES FROM EACH OTHER

[75] Inventors: Walter Löhr, Heuweiler; Norbert Grubhofer, Heidelberg; Inge Sohmer, Freiburg; Dietrich Wittekind, Bad Krozingen, all of Germany

[73] Assignee: Serva-Entwicklungslabor v. Grothe & Co., Heidelberg, Germany

[22] Filed: Mar. 18, 1976

[21] Appl. No.: 668,051

[30] Foreign Application Priority Data

Apr. 17, 1975 Germany .......................... 2516920

[52] U.S. Cl. .......................... 260/243 A; 210/31 C

[51] Int. Cl.[2] .......................... C07D 279/28

[58] Field of Search .......................... 260/243 A

[56] References Cited

OTHER PUBLICATIONS

Miller, et al., Chemical Abstracts, vol. 47, col. 10949 (1953) (abst. of Kolloid-Z. 131, pp. 154–158 (1953).

Yushina, Chem. Abstracts, vol. 52, col. 8417 (1958) (abst. of Zhur. Fiz. Khim 31, 2357–2360 (1957).

Arvan et al., Chem. Abstracts, vol. 60, col. 8815, (1964) (abst. of Dokl. Adad. Nauk SSSR 153, 1093–1096 (1963).

*Primary Examiner*—John D. Randolph

*Attorney, Agent, or Firm*—Hans Berman

[57] ABSTRACT

Mixtures of cationic thiazine dyes containing two or more members of the group consisting of thionine, azure A, azure B, azure C, and methylene blue may be resolved into pure individual compounds by column chromatography on slica gel using as a solvent system a mixture of water, acetic acid, and formic acid. The several fractions eluted sequentially from the column contain the pure individual dyes in the formate or acetate form. Because high solubility is essential for use of the dyes in staining blood smears, the acetates or formates are converted to the chlorides by adsorption on a solid substrate and contact with NaCl solution, elution with methanol, and recovery of the solid chlorides from the methanol solution.

2 Claims, No Drawings

METHOD OF SEPARATING THIONINE AND ITS N-METHYL DERIVATIVES FROM EACH OTHER

This invention relates to cationic thiazine dyes, and particularly to the recovery of pure, individual thiazine dyes from a mixture containing at least two members of the group consisting of thionine, azure A, azure B, azure C, and methylene blue.

The commercial thiazine dyes are mixtures of thionine and/or its N-methyl homologs, as can readily be established in a known manner by thin layer chromatography on a twodimensional substrate. However, thin-layer chromatography does not permit close estimation of the ratio of the homologs in the mixture, and cannot be modified for preparing amounts of the individual, pure dyes sufficient for routine use in the clinical laboratory. Yet, such pure dyes offer substantial advantages over the commercial mixtures.

Attempts at separating the several homologs by column chromatography on cellulose, alumina and Sephadex have been made since 1960, but did not yield sizable amounts of pure dyes.

It is a primary object of this invention to provide a method of separating mixtures of thionine and/or its N-methyl homologs into the pure, individual dyes on a sufficient scale to yield practically useful amounts of the components of the mixtures at reasonable cost.

It has been found that the commercial mixed thiazine dyes are readily separated into the pure components by column chromatography on silica gel using a mixture of water, formic acid, and acetic acid for elution. A preferred solvent system permitting particularly clean separation of the several azures may be prepared from 95 parts by volume 10% aqueous glacial acetic acid solution and 5 parts formic acid or equivalent amounts of the components in other form. The several sequential fractions of the eluate contain the pure individual thiazine dyes in the form of their acetates or formates which must then be converted to the chlorides. Effective conversion is achieved by adsorbing the pure dyes from the eluate fractions on a solid substrate, contacting them with aqueous NaCl solution for conversion to the chlorides without desorption, and elution with an organic solvent from which the solid chlorides are recovered.

The following Examples are further illustrative of this invention. All percentage values are by weight unless stated otherwise.

EXAMPLE 1

Aqueous 10% glacial acetic acid solution was mixed in a volume ratio of 95:5 with concentrated formic acid. Granular silica gel having a particle size of 0.032 to 0.063 mm was dispersed in enough of the solvent mixture to produce a slurry with which a glass column (7 cm dia. × 90 cm high) was charged in the usual manner. A commercial thiazine dye mixture containing azure B as the predominant component was dissolved in an amount of 4 g in the smallest sufficient amount of the same solvent mixture and slowly fed to the column. Eluent mixture was then passed over the column at at a rate of 500 ml per hour. Sequential 100 ml fractions of the eluate were individually collected and were tested for purity by thin-layer chromatography on silica gel plates using a solvent system of n-butanol/ethanol/acetic acid/water in a volume ratio of 50/20/10/20. The fractions containing pure azure B were combined.

The pure dye was present in the eluate as the acetate and/or formate and could be recovered as such in a conventional manner after removal of trace amounts of entrained silica gel by filtration through a sintered glass filter.

The formates and acetates of the cationic thiazine solvents are not readily soluble in the usual polar and apolar solvents employed in hematology, and the chlorides are needed for use as staining agents. Conventional methods may be followed for converting the carboxylic acid salts to the chlorides, but better yields are obtained by adsorbing the acetates and/or formates on a suitable substrate, contacting the adsorbed material with a soluble chloride such as sodium chloride in aqueous solution until converted to the chloride, and then to elute the chloride with an organic solvent, such as methanol.

EXAMPLE 2

A glass column was charged with an adsorbent resin (Resin XAD-2, Serva Laboratories, Heidelberg, Germany) having a particle size of 50 – 100 $\mu$ and equilibrated against the formic acid-acetic acid eluent. The column was wrapped in aluminum foil to protect its contents from light. The combined eluate fractions selected from Example 1 were passed over the resin, whereby the dye contained therein was adsorbed. A 5% aqueous, sodium chloride solution having a volume approximately equal to twice the capacity of the column was passed over the resin, whereby the formate and acetate ions present were replaced by chloride. Thereafter, the column was washed with distilled water until no chloride ions could be detected in the effluent by means of silver nitrate.

When methanol or another suitable organic solvent thereafter was passed over the column, the dye in the chloride form was discharged and recovered as a solid by evaporation of the solvent solution in a vacuum at 37° C. A higher drying temperature had to be avoided because of the limited thermal stability of the thiazine dye.

EXAMPLE 3

The eluted silica gel column employed in Example 1 still contained trace amounts of dye and unidentified byproducts of the original dye synthesis. It was regenerated for repeated use by the following sequence of steps:

1. Rinsing with water until the initially strongly acidic effluent was neutral.
2. Rinsing with aqueous 3% $KMnO_4$ solution until the entire silica gel charge assumed a purplish black color by reduction of the permanganate to mangenese dioxide and oxidation of organic matter.
3. Washing with water until no $KMnO_4$ was present in the effluent and the silica gel became yellowish to brown by removal of soluble oxidation products.
4. Removal of manganese dioxide by washing with 5% sodium dithionite ($Na_2S_2O_4$) solution, whereby the color of the silica gel changed to the pale yellow of precipitated sulfur.
5. Thorough washing with water until sodium dithionite could no longer be detected in the effluent by means of dilute $KMnO_4$ solution.
6. Washing with the acetic acid-formic acid mixture until equilibrium was established.

The column so treated was ready for chromatographic resolution of another batch of mixed dyes as described in Example 1. The six steps enumerated above are readily automatized so as to be performed without the intervention of a human operator in about 20 to 24 hours.

EXAMPLE 4

After several cycles of chromatographic separation, the treatment described in Example 3 did not produce a completely colorless adsorbent, but the silica gel showed a slight bluish discoloration from trace amount of retained dye. The following procedure was found to eliminate such discoloration without harmful effects on the adsorbent.

The column was washed with distilled water until the effluent was neutral. The column then was rinsed with 5% aqueous KOH solution which converted the dyes present to the reddish-purple dye bases. Methanol thereafter passed over the column eluted the colored material and was displaced by distilled water. The column was then ready for the passage of the acidic eluent mixture preparatory to another chromatographic separation. If a single treatment with potassium hydroxide followed by washing with mathanol did not remove the last traces of colored matter, these two steps were repeated once or more often. In any case, complete regeneration of the column was achieved within two hours.

Thionine and other pure N-mathyl homologs of thionine were present in small amounts in fractions of eluate prepared in Example 1 and not employed in Example 2. Technical grades of the cationic thiazine dyes other than azure B were purified and recovered in pure form in procedures not otherwise different from those described above.

Resin XAD-2 referred to in Example 1 is a macroreticular, non-ionic, non-polar, and hydrophobic adsorbent having a specific surface area of approximately 330 $m^2/g$ and is essentially a styrene-divinylbenzene copolymer. It is availble worldwide from Rohm & Haas Co., its foreign subsidiaries and licensees. It is commercially available in the United States as Amberlite XAD-2. Resin XAD-2, however, is merely typical of adsorbents useful in this invention and preferred at this time over other adsorbent substrates tested so far.

It will be appreciated that the preferred eluent for separation of the several thiazine dyes in the form of their acetates and/or formates may be prepared from components other than 10% glacial acetic acid and concentrated formic acid to have the same ultimate ratio of the components.

It should be understood, therefore, that the foregoing disclosure relates only to the presently preferred embodiments of this invention, and that it is intended to cover all changes and modifications of the examples of the invention herein chosen for the purpose of the disclosure which do not constitute departures from the spirit and scope of the invention as set forth in the appended claims.

What is claimed is:

1. A method of separating at least two mixed, cationic dyes of the group consisting of thionine, azure A, azure B, azure C, and methylene blue from each other which comprises:

a. subjecting said mixed dyes to chromatography on a column of silica gel with a solvent system consisting essentially of water, formic acid, and acetic acid until an eluate is discharged from said column;

b. separately collecting sequentially discharged fractions of said eluate, one of said fractions containing only one of the separated dyes, each dye being present in said fractions as the formate or acetate;

c. adsorbing the separated dye as the formate or acetate from said one fraction on an adsorbent substrate;

d. exposing the adsorbed dye to an aqueous sodium chloride solution until the dye is converted from the formate or acetate form to the chloride form; and e. eluting the dye in the chloride form from said substrate with an organic solvent volatile in a vacuum at 37° C.

2. A method as set forth in claim 1, wherein said solvent system contains said water, said formic acid, and said acetic acid in substantially the same ratio as a liquid mixture prepared from 95 parts by volume aqueous, 10% glacial acetic acid solution and 5 parts formic acid.

* * * * *

UNITED STATES PATENT AND TRADEMARK OFFICE
CERTIFICATE OF CORRECTION

PATENT NO. : 4,003,892

DATED : January 18, 1977

INVENTOR(S) : WALTER LÖHR ET AL

It is certified that error appears in the above-identified patent and that said Letters Patent are hereby corrected as shown below:

In the heading, line [75], change "Norbert" to -- Nikolaus --.

Signed and Sealed this

Twelfth Day of April 1977

[SEAL]

*Attest:*

RUTH C. MASON
*Attesting Officer*

C. MARSHALL DANN
*Commissioner of Patents and Trademarks*